Sept. 17, 1957  J. M. FOWLER  2,806,915
COLLISION RESPONSIVE SWITCH
Filed June 8, 1956  2 Sheets-Sheet 1
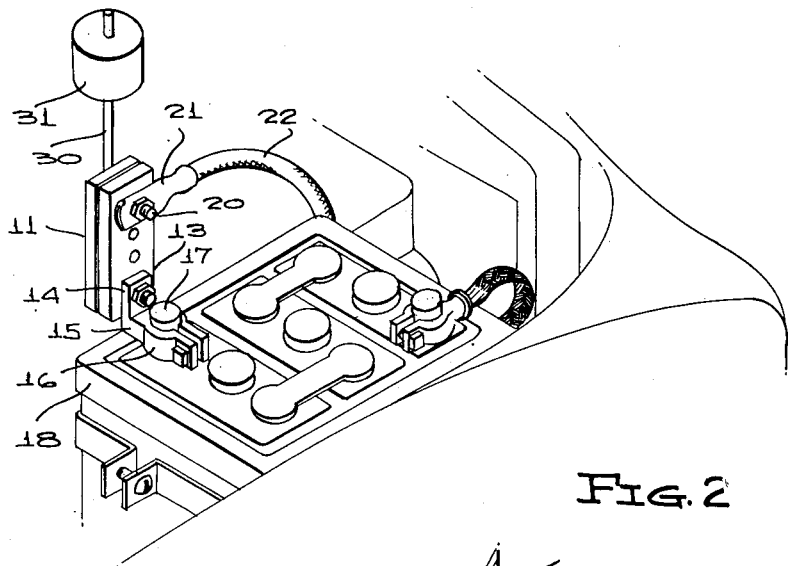
Fig. 1
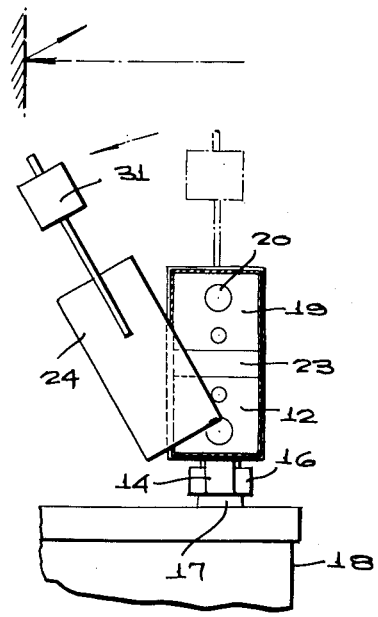
Fig. 2
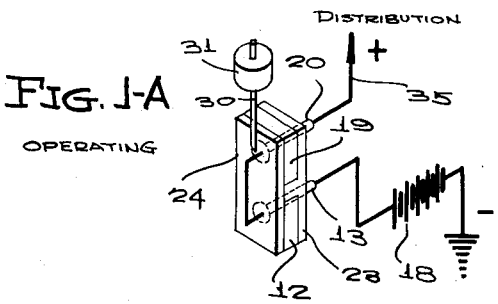
Fig. 1-A
OPERATING
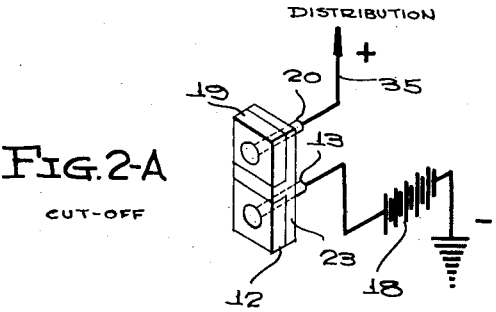
Fig. 2-A
CUT-OFF
INVENTOR.
JAMES M. FOWLER
BY
McMorrow, Berman & Davidson
ATTORNEYS Sept. 17, 1957 J. M. FOWLER 2,806,915
COLLISION RESPONSIVE SWITCH
Filed June 8, 1956 2 Sheets-Sheet 2
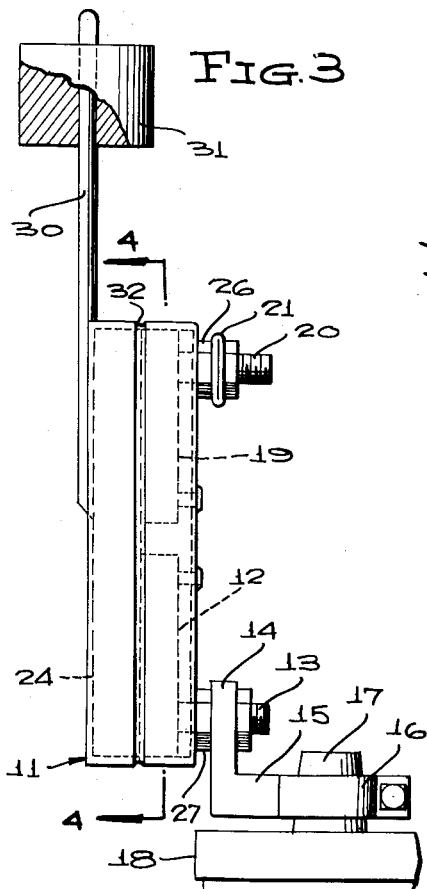
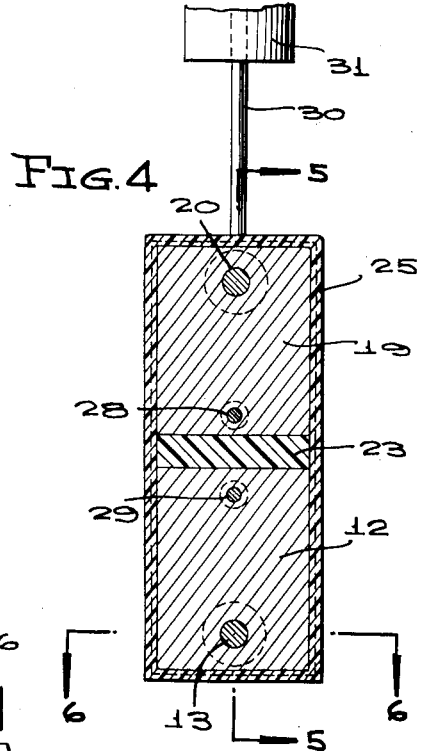
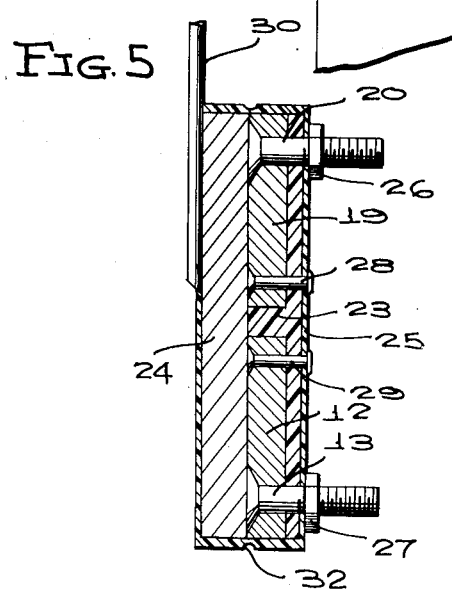
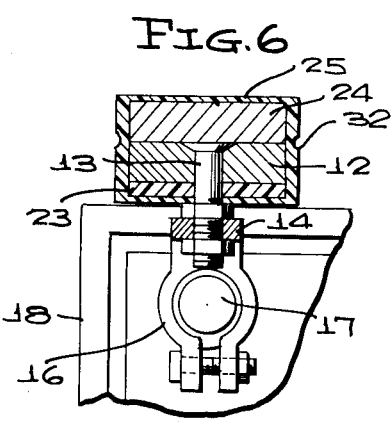
INVENTOR.
JAMES M. FOWLER
BY
McMorrow, Berman & Davidson
ATTORNEYS

2,806,915

COLLISION RESPONSIVE SWITCH

James M. Fowler, Spiceland, Ind.

Application June 8, 1956, Serial No. 590,321

2 Claims. (Cl. 200—61.45)

This invention relates to safety devices for vehicles, and particularly to a switch device adapted for use in the circuit of a vehicle battery for disconnecting the battery from the vehicle electrical distribution circuit responsive to a substantial impact, for example, responsive to a collision.

A main object of the invention is to provide a novel and improved impact-responsive circuit breaker for disconnecting the battery of a motor vehicle from the distribution circuit thereof in the event of a collision or other accident producing a substantial impact, whereby the danger of fire in the event of such an accident is reduced, the improved circuit breaker being simple in construction, being easy to install, and being reliable in operation.

A further object of the invention is to provide an improved impact-responsive circuit breaker for use in the battery circuit of a motor vehicle and arranged to disconnect the battery from the remainder of the circuit in the event of an accident causing a substantial impact, the circuit breaker being inexpensive to manufacture, being relatively compact in size, and being arranged for mounting directly on the vehicle battery so as to be supported thereby and whereby no special support means is required to connect the device to the frame of a vehicle.

Further objects and advantages of the invention will become apparent from the following description and claims, and from the accompanying drawings wherein:

Figure 1 is a perspective view of a portion of a motor vehicle, showing the motor vehicle battery and an impact-responsive circuit breaker according to the present invention mounted in operative position on the battery.

Figure 1A is a schematic diagram illustrating the electrical connections of the impact-responsive circuit breaker of Figure 1 with respect to the vehicle battery under normal conditions.

Figure 2 is an elevational view of the upper portion of a battery and the impact-responsive circuit breaker, showing the manner of movement of the weighted portion of the circuit breaker which occurs in the event of a collision or similar accident producing an impact.

Figure 2A is a schematic circuit diagram showing the electrical relationship of the impact-responsive circuit breaker with the vehicle battery and the distribution circuit of a vehicle after an impact has disconnected the battery from the circuit.

Figure 3 is an enlarged front elevational view, partly in cross section, of the impact-responsive circuit breaker of Figure 1, shown mounted on a battery post.

Figure 4 is a vertical cross sectional view taken on the line 4—4 of Figure 3.

Figure 5 is a vertical cross sectional view taken on the line 5—5 of Figure 4.

Figure 6 is a horizontal cross sectional view taken on the line 6—6 of Figure 4.

Referring to the drawings, the impact-responsive circuit breaker of the present invention is designated generally at 11 and comprises a first, generally rectangular, plate-like conductive body 12 through the lower portion of which extends a terminal bolt 13, said terminal bolt being adapted to be engaged with the upstanding vertical arm 14 of a battery clamp 15, as shown in Figure 3, the battery clamp 15 having the split collar portion 16 adapted to be clampingly engaged to one of the terminal posts 17 of a motor vehicle battery 18. Designated at 19 is a second, generally rectangular, plate-like conductive body which is located above and in vertical alignment with the first conductive body 12 and which is provided at its upper portion with a terminal bolt 20 on which is engageable the terminal lug 21 of a battery cable 22 leading to the motor vehicle electrical distribution system. The vertically aligned conductors 12 and 19 are embedded in a matrix of suitable insulating material 23, for example, a suitable plastic material. However, the faces of the conductive members 12 and 19 are exposed on one side of the matrix 23, and engaged therewith is a third, generally rectangular, plate-like conductive body 24 extending substantially for the full height of the composite structure defined by bodies 12 and 19 and the plastic matrix 23. The plate-like conductive member 24 is held firmly against the exposed surfaces of the vertically aligned conductive bodies 12 and 19 by frangible, insulating fastening means, comprising a shell 25 of relatively thin, frangible plastic material which surrounds the body 24 and the composite body defined by members 19, 12 and 23, as is clearly shown in Figure 5.

As shown in Figure 5, the terminal bolt 20 is provided with a lock nut 26 and the terminal bolt 13 is provided with a lock nut 27, said lock nuts engaging the surface of shell 25 opposite the body 24. The conductive members 12 and 19 are further secured in place by respective rivets 28 and 29 extending through said conductive bodies and the intervening portions of the matrix 23, and thence through the wall of the shell 25, as is clearly shown in Figure 5.

Rigidly secured to the upper portion of the conductive body 24 at its outer vertical surface is a rigid upstanding vertical rod 30 on the top portion of which is mounted a cylindrical weight 31 of substantial mass.

The shell 25 is substantially reduced in thickness at the joint between the body 24 and the bodies 19 and 12, as shown at 32, the groove 32 extending around the entire periphery of the device, whereby the weakened wall portion is presented at all peripheral portions of the joints.

As shown in Figure 1, the circuit breaker is mounted on one of the terminal posts 17 of the vehicle battery 18, whereby the device extends vertically upwardly and the rod 30 is likewise vertical, the weight 31 being thus located at the top portion of the device in a position to transmit its momentum through the rod 30 to the conductive body 24 in the event of a collision or other accident producing a sudden impact. As shown at Figure 1A the conductive member 24 normally bridges the conductive members 12 and 19 and thus selectively connects the battery 18 to its distribution circuit, shown at 35. In the event of an accident producing a sudden impact, such as a collision, the momentum of the weight 31 is suddenly transmitted to the conductive member 24, and the force developed by said momentum is sufficient to rupture the thin wall of the groove 32 at the joint between the conductive member 24 and the conductive members 12 and 19. As shown in Figure 2, the member 24 is thus detached from the members 12 and 19, open circuiting the device at the members 12 and 19 and thus disconnecting the battery 18 from the distribution circuit 35. With the battery 18 disconnected from the distribution circuit, the danger of fire produced by short circuit in the distribution system of the vehicle is completely eliminated.

While a specific embodiment of an improved impact-responsive circuit breaker for use on motor vehicle batteries has been disclosed in the foregoing description, it will be understood that various modifications within the sphere of the invention may occur to those skilled in the art. Therefore, it is intended that no limitations be placed on the invention except as defined by the scope of the appended claims.

What is claimed is:

1. An impact-responsive circuit breaker of the character described comprising a first vertical plate-like conductive body, a second vertical plate-like conductive body located above and in vertical alignment with said first body, said first and second bodies being embedded in an insulating material matrix to hold such bodies in vertical alignment, one of the adjacent faces of said first and second bodies being exposed, first terminal means on said first body adapted to be rigidly connected to a vehicle battery terminal, second terminal means on the second body adapted to be connected to the electrical system of a vehicle, a third vertical plate-like conductive body extending over and engaging the exposed adjacent faces of said first and second bodies, relatively frangible insulative means securing said third body in bridging conductive relationship against said first and second bodies, a rigid upstanding support member rigidly secured to and projecting verticaly upward from said third body, and a weight mounted on said support member in spaced relation to said third body and being of sufficient mass to rupture said frangible means in response to vehicle impact.

2. An impact-responsive circuit breaker of the character described comprising a first vertical plate-like conductive body, a second vertical plate-like conductive body located above and in vertical alignment with said first body, first terminal means on said first body adapted to be rigidly connected to a vehicle battery terminal, second terminal means on the second body adapted to be connected to the electrical system of a vehicle, a third vertical plate-like conductive body, a shell of relatively frangible insulating material surrounding said bodies and securing said third body in bridging conductive relationship against said first and second bodies, said shell being reduced in thickness at the joint between said third body and said first and second bodies, a rigid upstanding support member rigidly secured to and projecting vertically upward from said third body, and a weight mounted on said support member in spaced relation to said third body and being of sufficient mass to rupture said frangible material at said joint responsive to vehicle impact.

References Cited in the file of this patent

UNITED STATES PATENTS

| 1,743,314 | Brandon | Jan. 14, 1930 |
| 2,223,097 | Ehret | Nov. 26, 1940 |